United States Patent
Yousef et al.

(10) Patent No.: US 12,395,006 B2
(45) Date of Patent: Aug. 19, 2025

(54) UNDERVOLTAGE PROTECTION SYSTEM FOR POWER SUPPLY MANAGEMENT

(71) Applicant: Aptiv Technologies AG, Schaffhausen (CH)

(72) Inventors: Sebastian Yousef, Schaffhausen (CH); Manfred Ditze, Schaffhausen (CH); Thorsten Rosenthal, Schaffhausen (CH)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/428,712

(22) Filed: Jan. 31, 2024

(65) Prior Publication Data
US 2025/0239883 A1    Jul. 24, 2025

(30) Foreign Application Priority Data

Jan. 18, 2024    (EP) .................... 24152676

(51) Int. Cl.
*H02J 9/00*    (2006.01)
*B60R 16/03*    (2006.01)
*H02J 1/08*    (2006.01)

(52) U.S. Cl.
CPC .............. *H02J 9/002* (2013.01); *B60R 16/03* (2013.01); *H02J 1/084* (2020.01)

(58) Field of Classification Search
CPC ............ H02J 9/002; H02J 1/084; B60R 16/03
See application file for complete search history.

(56) References Cited

U.S. PATENT DOCUMENTS

| | | | | |
|---|---|---|---|---|
| 6,476,519 B1* | 11/2002 | Weiner | ................... | H02J 9/002 307/29 |
| 11,642,979 B2 | 5/2023 | Tournabien | | |
| 2016/0033984 A1* | 2/2016 | Lee | ......... | G05F 1/575 323/280 |
| 2016/0055049 A1* | 2/2016 | Lukashevich | ....... | G06F 11/0706 714/55 |
| 2019/0170336 A1* | 6/2019 | Sun | ...... | H05B 45/345 |
| 2020/0119369 A1 | 4/2020 | Westphal | | |

(Continued)

FOREIGN PATENT DOCUMENTS

| | | |
|---|---|---|
| CN | 111688614 A | 9/2020 |
| WO | 2023044216 A1 | 3/2023 |

OTHER PUBLICATIONS

Extended European Search Report for EP24152676.3 dated Jul. 9, 2024, 7 pages.

*Primary Examiner* — Lincoln D Donovan
*Assistant Examiner* — Alex W Lam
(74) *Attorney, Agent, or Firm* — Miller Johnson

(57) ABSTRACT

An apparatus controls the supply of power to multiple loads. The apparatus includes a first voltage monitor for monitoring a supply voltage. The apparatus includes a second voltage monitor for monitoring the supply voltage. The apparatus includes a control circuit for controlling a load driver to selectively drive the loads. The control circuit is configured to control the load driver to disconnect one or more predetermined ones of the loads from the supply voltage, in response to either of the first voltage monitor or the second voltage monitor determining an undervoltage condition. The first voltage monitor and the second voltage monitor are connected to the supply voltage in parallel.

15 Claims, 2 Drawing Sheets

(56) References Cited

U.S. PATENT DOCUMENTS

| | | |
|---|---|---|
| 2020/0384866 A1* | 12/2020 | Tagaya ................ G01R 31/006 |
| 2021/0384831 A1 | 12/2021 | Diaz De Leon Miranda |
| 2023/0077522 A1 | 3/2023 | Takahashi |
| 2023/0366914 A1 | 11/2023 | Braun |

* cited by examiner

UNDERVOLTAGE PROTECTION SYSTEM FOR POWER SUPPLY MANAGEMENT

CROSS-REFERENCE TO RELATED APPLICATIONS

This application claims priority to EP 24 152 676 filed Jan. 18, 2024, the entire disclosure of which is incorporated by reference.

FIELD

The present disclosure relates to undervoltage protection, and particularly to power supply management responsive to an undervoltage condition.

BACKGROUND

Many modern vehicles are compliant with ISO 26262, an international standard defined by the International Organization for Standardization (ISO) concerning functional safety. Functional safety is defined in ISO 26262 as "the absence of unreasonable risk due to hazards caused by malfunctioning behavior of electrical or electronic systems". ISO 26262 defines a series of Automotive Safety Integrity Levels (ASILs), which classify safety requirements for a particular automotive component to be compliant with ISO 26262. ASIL D represents the strictest set of requirements, applied to safety-critical components such as airbags or brakes. ASIL A is the lowest functional safety rating, applied to components such heating and cooling or rear lights. An additional 'quality management' (QM) level, ASIL (QM), is applied to components for which there are no safety requirements, such as a radio or USB connection.

The electrical configuration of an automotive system may employ a number of different topologies to enable powering and control of a vehicle's components. Examples of commonly-used topologies are domain-based zonal and decentralized topologies, based on a network of electronic control units (ECUs), in which each ECU may control one or more components grouped by function or physical location within the vehicle. Since automotive components are associated with different ASIL-defined functional safety requirements, a particular ECU may have mixed criticality if it controls both safety-critical and non-safety-critical loads.

The supply voltage which is applied to the ECU affects the extent to which the loads of the ECU can be powered. The supply voltage to the ECU is derived from the power system of the vehicle, which may comprise a plurality of interconnected energy sources, such as batteries. In the event of a failure on one of those energy sources, or if a large load is connected to the energy sources, a voltage drop in the combined supply voltage can result.

If the supply voltage drops in this manner, referred to herein as an 'undervoltage', a critical power supply situation can occur unless non-critical loads are not switched off. If non-critical loads are not switched off, the load for the power source is not reduced, and there may be insufficient or an unstable voltage available to power critical loads, resulting in a loss of critical vehicle function.

In view of the above, there is a need to reduce the overall load on the vehicle's power supply in the event of undervoltage in order to be preserve critical vehicle functionality, and to enable compliance with a particular ASIL requirement as defined by ISO 26262.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to a first aspect, there is provided an apparatus for controlling the supply of power to a plurality of loads, comprising a first voltage monitor for monitoring a supply voltage, a second voltage monitor for monitoring the supply voltage, a control circuit for controlling a load driver to selectively drive the plurality of loads, wherein the control circuit is configured to control the load driver to disconnect one or more predetermined loads of the plurality of loads from the supply voltage, if either of the first voltage monitor or the second voltage monitor determines an undervoltage condition, wherein the first voltage monitor and the second voltage monitor are connected to the supply voltage in parallel.

In this way, there is provided a fast, cost-effective solution for implementing a mechanism for preserving safety-critical loads in the event of a sudden drop in one or more voltage domains of the vehicle's power supply. An optimum failures-in-time (FIT) rate is achieved by use of two voltage independent voltage monitoring paths.

In embodiments, the first voltage monitor comprises an operational amplifier configured to compare the supply voltage with a threshold voltage. An operational amplifier has a fast response time and enables rapid generation of a change in output state when the supply voltage falls below the threshold voltage.

In embodiments, the first voltage monitor is a first operational amplifier having a non-inverting input to receive a first threshold voltage, and an inverting input to receive the supply voltage, and the second voltage monitor is a second operational amplifier having a non-inverting input to receive the supply voltage, and an inverting input to receive a second threshold voltage. In this manner, the two voltage monitors are configured differently so as to diversify the voltage monitoring function of the apparatus. This reduces interference between the two voltage monitoring signal paths, and reduces systematic errors.

In embodiments, the second voltage monitor is a reset generator. In this way, the combination of an operational amplifier and a voltage monitor further diversifies the decomposition of the voltage monitoring function, and reduces interference yet further.

In embodiments, the first voltage monitor and the second voltage monitor are arranged to output respective first and second logical signals having a first state if an undervoltage condition is detected, and to output respective first and second logical signals having a second state if an undervoltage condition is not detected, wherein the control circuit is configured to perform a logical OR operation on the first and second signals, and the first and second states are such that a control signal is provided to the load driver to disconnect one or more predetermined loads from the supply voltage if an undervoltage condition is detected by either of the first or second voltage monitors. In this manner, it is possible for safety critical loads to be shut down even if only one voltage monitor detects an undervoltage condition.

In embodiments, the control signal comprises one or more override signals which override a respective one or more control signals provided to the load driver from an electronic control unit to control a respective one or more loads, the one or more override signals overriding the respective one or more control signals for the predetermined loads. Therefore, the electronic control unit does not need to be reprogrammed, or to generate new control signals in response to an undervoltage condition. Instead, the load driver will respond differently to the original control signals, enabling a faster response time.

In embodiments, the one or more predetermined loads have a functional safety requirement lower than a threshold level of criticality. The threshold can be set, via configuration of the threshold voltage and the arrangement of critical and non-critical loads in the load driver, so that an overall functional safety of at least ASIL B is achieved. This functional safety level is based on the maximum functional safety level of a non-critical load to be deactivated, and corresponds to the minimum functional safety level of a critical load that is preserved.

In embodiments, the apparatus further comprises means for setting one or more threshold voltages defining an undervoltage condition. The threshold voltages can be easily set and adjusted by resistor selection in voltage divider circuits.

In embodiments, the first voltage monitor is arranged to determine an undervoltage condition when the supply voltage is less than a first threshold voltage, and the second voltage monitor is arranged to determine an undervoltage condition when the supply voltage is less than a second threshold voltage different from the first voltage. A race condition, otherwise caused by the presence of two different voltage monitor paths, is avoided in this way.

In embodiments, the control circuit is configured to disconnect the one or more predetermined loads within a response time of 100 μs from either of the first or second voltage monitors detecting that the supply voltage is below 6.5 V. This is a reaction time in accordance with VDA 450, which defines electrical power supply requirements which comply with ISO 26262. Such a response time would not be possible using a microcontroller alone.

In embodiments, the apparatus further comprises a storage means for recording one or more instances of an undervoltage condition. From this, diagnostic information can be obtained by the electronic control unit to identify causes of the undervoltage condition or longer-term behavioral patterns.

In embodiments, the storage means is a latch circuit. Such a circuit enables a fast data acquisition time, greater than what could be achieved using a controller, and therefore reducing the number of undervoltages that would otherwise be missed by such a controller.

According to a second aspect there is provided a vehicle system comprising a plurality of automotive system components defining a respective plurality of loads, an electronic control unit for controlling the plurality of automotive system components, a power supply for providing a supply voltage to the electronic control unit, a load driver, controlled by the electronic control unit, for driving the plurality of loads, an apparatus as set out above, for controlling the load driver to disconnect predetermined loads of the plurality of loads from the supply voltage if either or each of the first voltage monitor or the second voltage monitor determines an undervoltage condition in the supply voltage.

In embodiments, the electronic control unit is arranged to control operation of the first and second voltage monitors. This enables unnecessary tracking of transient supply voltages, following reset of the voltage monitoring function, to be avoided.

In embodiments, the electronic control unit is arranged to provide one or more first test signals to the first voltage monitor, and one or more second test signals to the second voltage monitor, to simulate one or more undervoltage conditions, and to compare operation of the control circuit with a predefined operation to verify disconnection of the one or more predetermined loads in response to the simulated one or more undervoltage conditions. In this way, a self-test function is provided such that a vehicle can verify the operation of its undervoltage detection capability.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Illustrative embodiments will now be described with reference to the drawings.

In the drawings, reference numbers may be reused to identify similar and/or identical elements.

DETAILED DESCRIPTION

Figure 1:
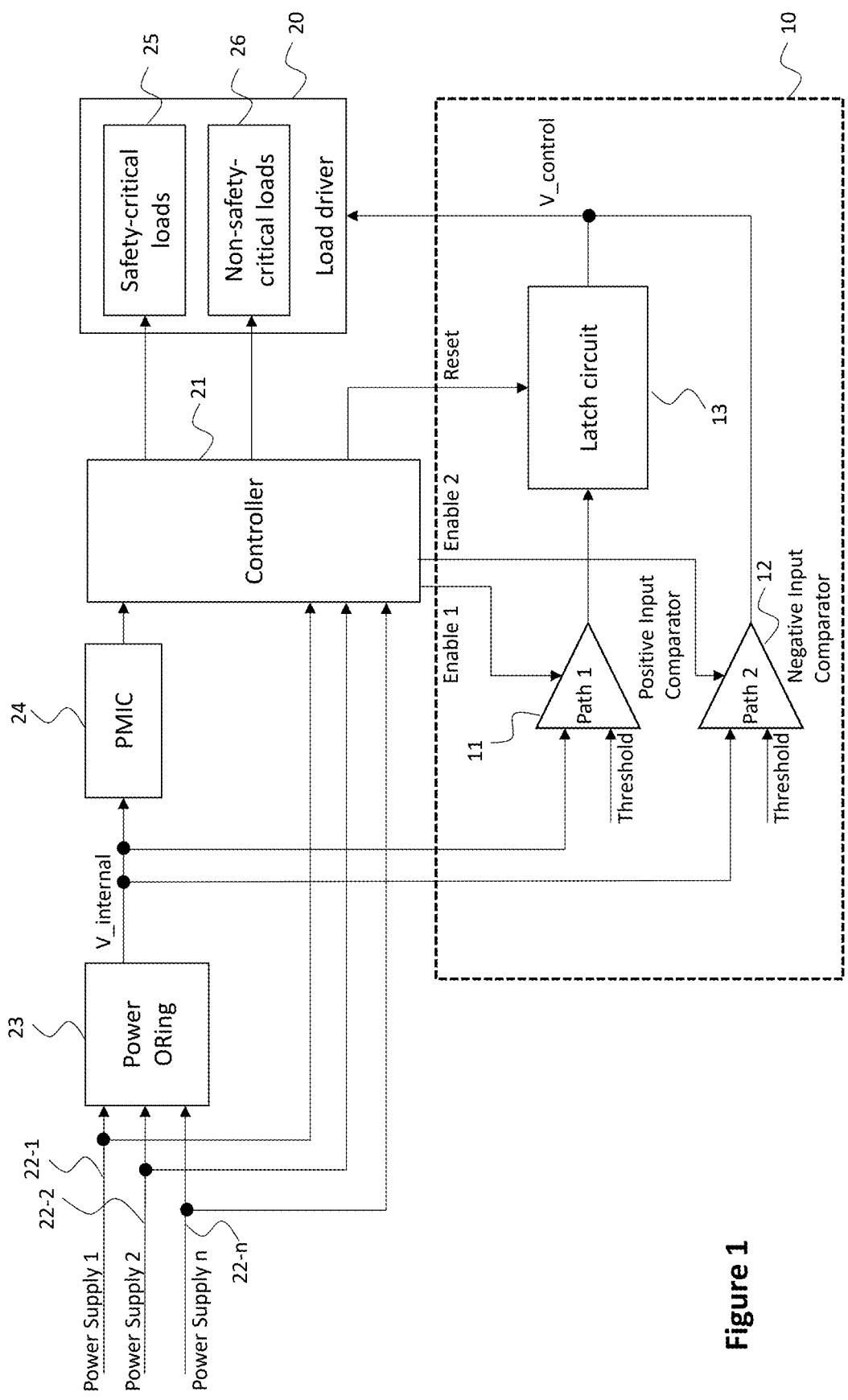
FIG. 1 shows a schematic representation of a circuit according to a first embodiment.

FIG. 1 shows a schematic representation of the arrangement of a power supply control apparatus 10 according to a first embodiment. The power supply control apparatus 10 is for use with an automotive system in which a load driver 20 supplies automotive components, such as lights, air conditioning and entertainment systems with electrical power, according to commands from a controller. The controller 21 is an electronic control unit such as a microcontroller. The power supply control apparatus 10 is configured for installation in in a main power supply distribution box or fuse box of the automotive system.

The electrical power is derived from a plurality of power supplies 22-1, 22-2, 22-$n$, such as a batteries, a generator, a DC-to-DC converter, and so on. The power supplies 22-1 . . . 22-$n$ are combined using an ORing configuration 23 implemented as diodes or transistors, in order to isolate them from each other, while achieving power supply redundancy to ensure that a system can continue to operate correctly in the event of failure of any individual power supply. Each power supply 22-1 . . . n acts as a voltage source, whose supply voltage is monitored by the controller 21.

The output of the power ORing operation 23 is an internal power supply voltage, V_internal, which is the basis of the supply voltage for the load driver 20. V_internal is the voltage to be protected against voltage drops by the power supply control apparatus 10 of the first embodiment. V_internal is provided to a power management integrated circuit (PMIC) 24 which applies any of a number of power management functions to V_internal such as voltage regulation, or DC-to-DC conversion, so that the voltage provided to the load driver 20 by the controller 21, which receives the output of the PMIC 24, is appropriate for the loads which are to be driven. In normal operation, V_internal is sufficient for both safety-critical loads 25 (also referred to herein as 'critical loads') and non-safety-critical loads 26 (also referred to herein as 'non-critical loads') to be supplied with power.

The power supply control apparatus 10, according to the first embodiment, comprises a first voltage monitor 11 and a second voltage monitor 12. The first and second voltage monitors 11, 12 are connected to V_internal in parallel, as shown in FIG. 1. In the first embodiment, each of the first 11 and second 12 voltage monitors comprises an operational amplifier (op-amp), which is activated or deactivated by the controller 21 via a corresponding enable signal. The function of each op-amp 11, 12 is to compare V_internal with a threshold voltage. If V_internal falls below the threshold voltage, each op-amp 11, 12 will detect this undervoltage event and change its output state.

The outputs of the two op-amps 11, 12 are combined logically in a manner such that a control signal, V_control, is provided to the load driver 20 if either or each of the two op-amps 11, 12 detects an undervoltage in V_internal. In embodiments, the logical combination is an OR operation. The control signal V_control is such that it causes signals output by the controller 21 to the load driver 20 to be effectively overwritten, in a way in which non-critical loads 26 are shut down or deactivated. In this manner, it can be ensured that there is sufficient supply voltage to preserve the operation of critical system functions.

In the first embodiment, the logical combination of the output states of the op-amps 11, 12 is such that a binary signal is applied to the load driver 20, which can be understood as either an override instruction, or a do-not-override or pass-through instruction. For such a system, the non-critical loads 26 to be deactivated are identified by the load driver 20 as a group of predetermined loads whose operation is are either deactivated by zeroing the corresponding drive output from the load driver 20, or preserved, by maintaining the drive signal specified by the load driver 20 for normal operation, responsive to the control signal V_control which is output from the power control supply apparatus 10. The state of predetermined loads can be modified by configuring the load driver 20 accordingly.

In particular, the load driver 20 is configured to specify a set of one or more non-critical loads 26 which are to be deactivated on detection of an undervoltage condition. An example of a non-critical load 26 is a heated seat system, whose function is not essential to the safety of the vehicle. Other examples are high-side drivers, low-side drivers, eFuses, and H-Bridges. The set of loads is configured as required by particular requirements, and in the first embodiment of the present invention, it is possible for ASIL B level of functional safety, or higher, to be achieved if ASIL A or ASIL QM-rated loads are automatically shut down on detection of an undervoltage in V_internal.

The decomposition of the voltage monitoring function of the power supply control apparatus 10 into two independent signal paths introduces diversity, required by the ISO 26262 standard, in the specific mechanism by which undervoltage in V_internal is detected. This reduces or eliminates systematic faults such as interference between the two voltage monitoring paths, or soft errors that might otherwise affect monitoring of a voltage. A failures-in-time (FIT) rate of the power supply control apparatus 10 can be reduced accordingly. In the first embodiment, diversity is achieved by configuring the first op-amp 11 so that it receives V_internal at its non-inverting input, representing a positive input comparator, and configuring the second op-amp 12 so that it receives V_internal at its inverting input, representing a negative input comparator. The two op-amps 11, 12 therefore generate inverted output signals, with respect to each other, and their specific modes of operation are different from each other.

The inverting input to the first op-amp 11 and the non-inverting input to the second op-amp 12 are threshold voltages provided from voltage sources. The threshold voltages may be controlled using a controllable voltage source, a potential divider, resistor selection, or any other suitable voltage control technique. The threshold voltages provided to each op-amp 11, 12 represent undervoltage detection thresholds which are substantially the same as each other. It can, however, be beneficial in embodiments to use diversified threshold voltages for each op-amp 11, 12. Different threshold voltages can be derived by applying different voltage divider configurations to a reference voltage for the two different voltage monitoring paths. An advantage of the use of different threshold voltages is that a race condition, in which incorrect control may be otherwise applied briefly to the load driver 20, due to differences in the signal propagation paths through the two voltage monitors to the logical combination of the output of these paths for control signal generation, is avoided. The threshold voltages should be sufficiently distinct to establish diversity in the voltage monitoring channels, but sufficiently close together that so as not to introduce a delay in undervoltage detection in the voltage monitoring path having the lower threshold. It will be appreciated that specific threshold voltages will depend on the supply voltages, the op-aps and latch circuits used (slew rates, reaction times) etc., and can be selected accordingly by those skilled in the art.

In the first embodiment, a latch circuit 13 is arranged in the first voltage monitoring path between the output of the first op-amp 11 and the load driver 20. The latch circuit 13 is not essential for the shutdown of non-critical loads 26, but it enables the controller 21 to check input and output stages to evaluate the reason for the deactivation of one or more loads, and to ensure that no error still exists, before normal operation is resumed.

In the first embodiment, the latch circuit 13 operates on the principles of a set-reset (SR) latch, with a reset signal provided by the controller 21, and the set signal provided by the state of the output of the first op-amp 11. The controller 21 is able to activate the reset signal in order to arm the latch circuit 13 to monitor for undervoltage events. The advantage of this mechanism is it is not necessary to wait for the controller's clock cycle to complete before an undervoltage event is detected, as the latch circuit 13 will capture this event as soon as the set signal changes, based on the response time of the first op-amp 11. Without the latch circuit 13, any diagnostic operations would be performed directly by the controller 21, and so detectable state changes would be limited by the clock speed of the controller 21.

An example of behavior which can be determined by the controller 21, based on the logical states, is the stability of V_internal, based on the number of op-amp output state changes occurring within a predetermined period of time. From such a diagnosis, a warning message can be displayed to a vehicle's user, on a control panel or dashboard, alerting the user to the presence of a systematic fault with the vehicle's power system or battery.

The presence of the latch circuit 13 introduces a distinction between the first and second signal paths, so that by setting the threshold voltage of the first op-amp 11 to be higher than for the second op-amp 12, the first op-amp 11 will detect an undervoltage before the second op-amp 12 does, if V_internal drops from a level above the first threshold voltage level to below the second voltage level. The difference between the threshold voltages can be relatively small so such that a delay introduced by the presence of the latch circuit is compensated for by the timing between detection of undervoltage in each path.

The use of the two op-amps 11, 12 is such that a response to V_internal dropping below a threshold occurs within 100 µs. This is a rapid response to a sudden drop in V_internal, and is significantly quicker than a response which could be obtained if non-critical loads 26 were to be deactivated by a microcontroller, for example, the response time for which is limited by the cycle time of the microcontroller's operating system, and the time to perform analogue-to-digital conversion necessary for mathematical operations. A response time of this order complies with the specification set out in a standard such as VDA 450.

As will be appreciated from the foregoing, rapid response times and low error rates are achieved in a cost-effective apparatus, based on the simplicity and speed of the components which are used.

A number of modifications to the power control apparatus 10 of the first embodiment may be made.

Firstly, it is described above that there are advantages to be gained by decomposing the voltage monitoring function into diverse monitoring paths. As well as, or in addition to distinguishing the op-amps in each voltage monitoring path by their inverting or non-inverting configuration, it is possible, in embodiments, to make use of two different op-amp types (model number, configuration, manufacturer). In embodiments, one of the op-amps is substituted with a different voltage monitoring component, such as a reset generator (for example, a TPS 3808 generator or similar). Generally, components having as fast a reaction time as possible are optimal. Increasing the level of diversity between channels will enable interference between the channels to be reduced.

Secondly, the latch circuit 13 can be constructed using any appropriate logical configuration which can track a sequence of states from which an undervoltage condition can be identified, and it is not essential for it to be based on SR-logic. In embodiments, the latch circuit 13 is omitted altogether.

Figure 2:
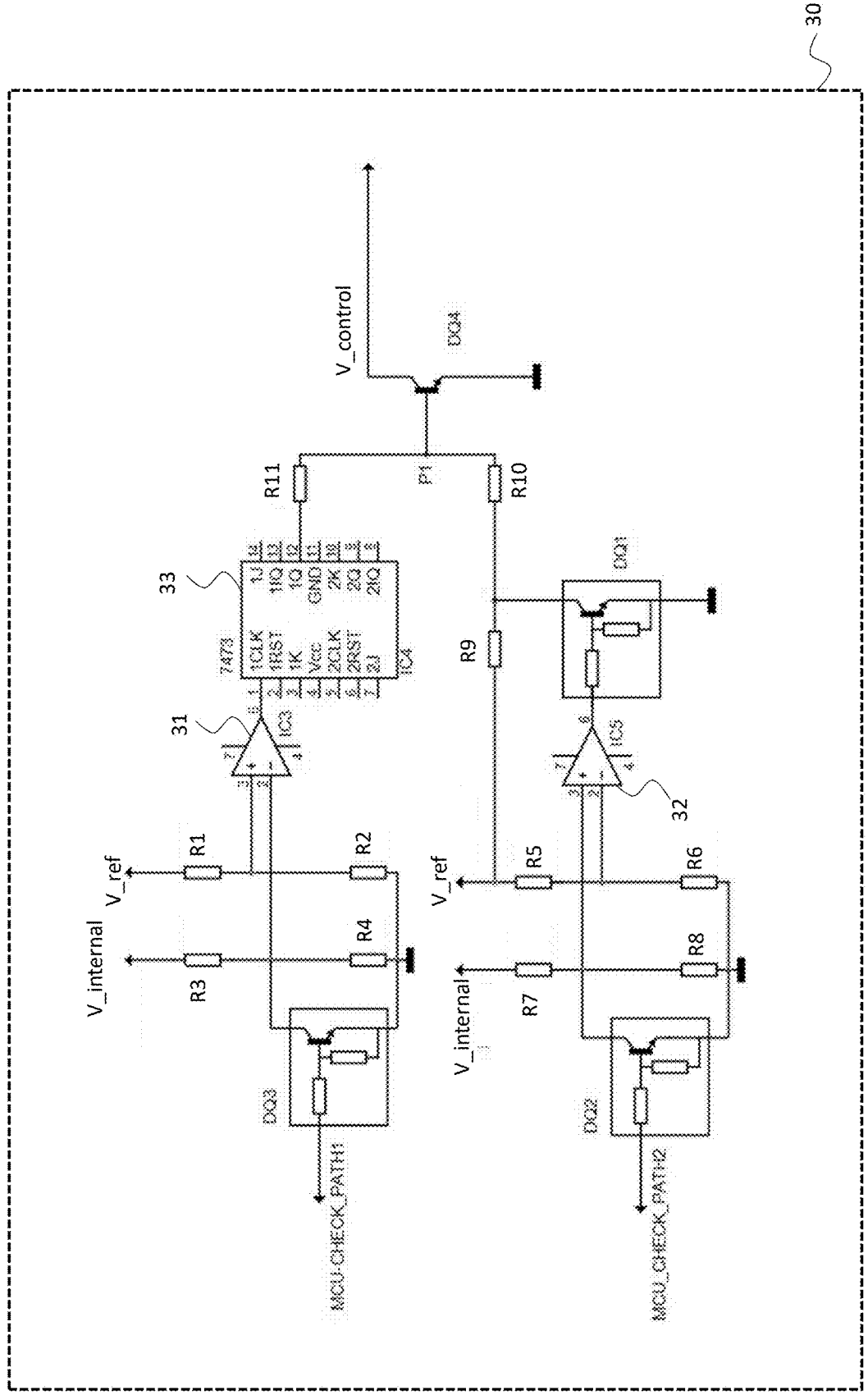
FIG. 2 shows a schematic representation of a circuit according to a second embodiment.

FIG. 2 illustrates a power supply control apparatus 30 of a second embodiment. The principle of operation of the power supply control apparatus 30 is similar to that described with reference to FIG. 1, based on the use of two op-amps 31, 32, and a latch circuit 33. In the second embodiment, the latch circuit 33 is what is known in the art as a 7473 dual J-K flip-flop, but this is simply for the purpose of illustration and any suitable latch circuit 33 can be used.

FIG. 2 shows that the supply voltage, V_internal, is divided, by a voltage divider, to threshold levels appropriate for monitoring at each op-amp 31, 32, taking into account the electrical characteristics of the op-amps 31, 32 in terms of gain, input impedance, supply voltage, and so on. In the embodiment of FIG. 2, a fraction of V_internal is input to each op-amp 31, 32 as the voltage to be monitored, via the ratios R4/[R3+R4] and R8/[R7+R8]. The first op-amp 31 takes the monitored voltage at its inverting input, and the second op-amp 32 takes the monitored voltage at its non-inverting input.

Threshold voltages are applied to the non-inverting input of the first op-amp 31 and the inverting input of the second op-amp 32. Again, a voltage divider arrangement is used, as shown in FIG. 2, based on resistors R1, R2, R5 and R6. The use of a voltage divider facilitates adjustment of the undervoltage threshold by changing the values of the resistors.

The specific values of each resistor depend on the applied voltage domain and desired reaction times.

The power control apparatus 30 of the second embodiment is used in conjunction with a testing process, by which a vehicle can automatically simulate a number of conditions, in terms of their impact on the voltages monitored by the op-amps 31, 32, and determine whether the corresponding power control operation is performed correctly. This is achieved based on the configuration of control signals (MCU-CHECK_PATH1 and MCU-CHECK_PATH2) which are provided from the controller (not shown) to the bases of bipolar transistors Q3 and Q2 respectively.

Each of MCU-CHECK_PATH1 and MCU-CHECK_PATH2 enables control of the voltage to be monitored, by shorting the respective monitoring terminal of the op-amps 31, 32 to ground. When MCU-CHECK_PATH1 is high, Q3 switches on, which pulls down the voltage of the inverting input of the first op-amp 31 to ground. When MCU-CHECK_PATH1 is low, Q3 switches off, and the voltage of the inverting input remains at a voltage-divided fraction of V_internal. Similarly, when MCU-CHECK_PATH2 is high, Q2 switches on and pulls the non-inverting input of the second op-amp 32 to ground. When MCU-CHECK_PATH2 is low, Q2 switches off, and the voltage of the non-inverting input remains at a voltage-divided fraction of V_internal.

If the second op-amp 32 detects an undervoltage, such that the voltage on the non-inverting input is less than the threshold voltage and the inverting input, digital transistor DQ1 is off as the second op-amp 32 output is low. In this instance, the base voltage of transistor Q4 is high, independently of the output of the latch circuit 33, due to the nature of the path through R11, R10, R9, R5 and R6, and the threshold voltage source, V_ref, between R5 and R9. If Q4 is on, V_control is low as it is pulled to ground via the emitter of Q4, and non-critical loads are deactivated.

Conversely, if the second op-amp 32 does not detect an undervoltage condition, DQ1 is on, and the base voltage of Q4 is dependent on the output of the latch circuit 33. If the output of the latch circuit 33 is high, due to the detection of an undervoltage by the first op-amp 31, the base of Q4 is high, and V_control is low, deactivating non-critical loads. If the output of latch circuit 33 is low, in the absence of an undervoltage detected by the first op-amp 31, Q4 is off and V_control is high. Therefore, V_control is low if undervoltage is detected by either op-amp 31, 32.

In the embodiment illustrated in FIG. 2, transistors DQ1, DQ2 and DQ3 are digital transistors in which switching thresholds can be controlled via the selection of the base-emitter resistor, and the transistors are current-controlled via the base resistor. Transistor Q4 is not a digital transistor, and so is voltage-controlled, with rapid switching speed.

Table 1 shows examples of test scenarios which are applied.

TABLE 1

BIST procedure in parking mode

| Test case | Precondition | Testcase I/O control | Pass Criteria | Fail Criteria | Comment |
|---|---|---|---|---|---|
| Measurement of supply voltage domains | MCU-CHECK_PATH 1: Low<br>MCU-CHECK_PATH 2: Low<br>Disable Comparator 1<br>Disable Comparator 2<br>V_control: high | MCU-CHECK_PATH 1: Low<br>MCU-CHECK_PATH 2: Low<br>Disable Comparator 1<br>Disable Comparator 2 | Power Supply 1 . . . n is within tolerated levels | Power Supply 1 . . . n is NOT within tolerated levels | All conditions to perform self-test are fulfilled |
| Changing input voltage in first op-amp | MCU-CHECK_PATH 1: Low<br>MCU-CHECK_PATH 2: Low<br>Disable Comparator 1<br>Disable Comparator 2<br>V_control: high | MCU-CHECK_PATH 1: Low<br>MCU-CHECK_PATH 2: High<br>Enable Comparator 1<br>Enable Comparator 2 | Logic level on V_control changes to low | Logic level on V_control keeps high | Proving component functionality of both paths |
| Changing input voltage in second op-amp | MCU-CHECK_PATH 1: Low<br>MCU-CHECK_PATH 2: Low<br>Disable Comparator 1<br>Disable Comparator 2<br>V_control: high | MCU-CHECK_PATH 1: High<br>MCU-CHECK_PATH 2: Low<br>Enable Comparator 1<br>Enable Comparator 2 | Logic level on V_control changes to low | Logic level on V_control keeps high | Proving component functionality of both paths |
| Changing Enable Status on both Comparators | MCU-CHECK_PATH 1: Low<br>MCU-CHECK_PATH 2: Low<br>Disable Comparator 1<br>Disable Comparator 2<br>V_control: high | MCU-CHECK_PATH 1: Low<br>MCU-CHECK_PATH 2: Low<br>Enable Comparator 1<br>Enable Comparator 2 | Logic level on V_control keeps high | Logic level on V_control changes to low | |
| Reset latch | MCU-CHECK_PATH 1: Low<br>MCU-CHECK_PATH 2: Low<br>Disable Comparator 1<br>Disable Comparator 2<br>V_control: low | MCU-CHECK_PATH 1: Low<br>MCU-CHECK_PATH 2: Low<br>Enable Comparator 1<br>Enable Comparator 2<br>RESET_LATCH: high | Logic level on V_control changes to high | Logic level on V_control keeps low | |

It is possible to simulate an undervoltage on the monitored input to either op-amp by transitioning the respective MCU-CHECK_PATH signal from low to high, and enabling the op-amps 31, 32 via enable signals from the controller (not shown), to determine with V_control is as expected. In this manner, the controller is able to bypass V_internal to test if a voltage monitoring path is operational.

It is also possible to test the output of the vehicle's power supplies by deactivating both the op-amps 31, 32 and the MCU-CHECK_PATH signals in order to establish the conditions required for testing are fulfilled. The voltages are measured by the controller, in an analogous manner to what is shown in FIG. 1. Finally, resetting of the latch circuit 33 is tested by application of a reset signal, and enabling the op-amps 31, 32, without applying MCU-CHECK_PATH signals, to determine whether this causes an expected change in V_control.

The tests set out in Table 1 are appropriate for performance when a vehicle is in a parking mode, as part of a built-in self test (BIST) operation. If the BIST is passed, a positive voltage on V_control is interpreted as representing normal behavior, as set out above. No override is applied to the load driver 20, but undervoltage detection can be considered as 'armed'. In contrast, if V_control is low, it is determined that V_internal has dropped due to an overload situation. The load driver 20 deactivates predefined loads, as described above, which is detected by the controller. The controller re-initializes the voltage monitoring system. The re-initialization is performed by disabling the op-amps, resetting the latch circuits, and then re-enabling the op-amps. A period of time in which the op-amps are not active is useful to enable system transients to pass.

It is also possible for the controller to detect specific voltages of the power supplies after the undervoltage in V_internal is detected, in order to identify specific and continuing problems, or obstacles to re-initializing voltage monitoring. This can protect energy resources or a wiring harness where continued operation might otherwise cause damage to a battery or any system components. In situations where full operation cannot be restored, a warning message is generated for display on a control panel or dashboard, so that a vehicle's user can perform repairs.

The self-testing operation described in relation to FIG. 2 can be implemented in the embodiment of FIG. 1 as a vehicle system, according to embodiments of the present disclosure, comprising a plurality of automotive system components defining a respective plurality of loads, an electronic control unit for controlling the plurality of automotive system components, a power supply for providing a supply voltage to the electronic control unit, a load driver and the power supply control apparatus of embodiments of the present disclosure. The electronic control unit corresponds to the controller 21 shown in, for example, FIG. 1, which generates MCU-CHECK_PATH signals and the op-amp enable circuits. The vehicle system may interface with other control systems of the vehicle, and the controller may interface with one or more controllers of the vehicle.

The testing procedure is configured according to a series of computer-executable instructions to be executed by the controller in order to control the sequencing and level of the enable signals and MCU-CHECK_PATH signals which are provided to the op-amps. The computer-executable instructions can be updated and downloaded by the vehicle periodically in order to reconfigure the test process.

Additionally, the modifications to the first embodiment described above are applicable also to the second embodiment, so that the specific op-amp configurations can be changed, an op-amp can be substituted by a reset generator, and so on.

It will be understood that the embodiments illustrated above show applications only for the purposes of illustration. In practice, embodiments may be applied to many different configurations, the detailed embodiments being straightforward for those skilled in the art to implement in view of the teaching set out in the present disclosure. The power supply control apparatus is configured in accordance with system requirements, defining a sensitivity to undervoltage, and takes into account the number and nature of the loads to be supplied, and a permitted voltage drop in V_internal for which non-critical loads can be preserved so that non-critical loads are not deactivated unnecessarily.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. An apparatus for controlling a supply of power to a plurality of loads, the apparatus comprising:
a control circuit configured to control a load driver to selectively drive the plurality of loads;
a first voltage monitor configured to monitor a supply voltage and, in response to detection of an undervoltage condition, output a first undervoltage signal to the control circuit; and
a second voltage monitor configured to monitor the supply voltage and, in response to detection of an undervoltage condition, output a second undervoltage signal to the control circuit,
wherein the control circuit is configured to, in response to receipt of at least one of the first undervoltage signal and the second undervoltage signal, control the load driver to disconnect one or more predetermined loads of the plurality of loads from the supply voltage, and
wherein the first voltage monitor and the second voltage monitor are connected to the supply voltage in parallel.

2. The apparatus of claim 1 wherein the first voltage monitor includes an operational amplifier configured to compare the supply voltage with a threshold voltage.

3. The apparatus of claim 2 wherein:
the first voltage monitor is a first operational amplifier including:
a non-inverting input to receive a first threshold voltage, and
an inverting input to receive the supply voltage; and
the second voltage monitor is a second operational amplifier including:
a non-inverting input to receive the supply voltage, and
an inverting input to receive a second threshold voltage.

4. The apparatus of claim 2 wherein the second voltage monitor is a reset generator.

5. The apparatus of claim 1 wherein:
the first and second undervoltage signals are, respectively, first and second logical signals having a first state in response to an undervoltage condition being detected and a second state in response to an undervoltage condition not being detected,
the control circuit is configured to perform a logical OR operation on the first and second logical signals, and
the first and second states are such that a control signal is provided to the load driver to disconnect one or more predetermined loads from the supply voltage in response to an undervoltage condition being detected by either of the first or second voltage monitors.

6. The apparatus of claim 5 wherein:
the control signal includes one or more override signals that override a respective one or more control signals provided to the load driver from an electronic control unit to control a respective one or more loads, and
the one or more override signals override the respective one or more control signals for the predetermined loads.

7. The apparatus of claim 1 wherein the one or more predetermined loads have a functional safety requirement lower than a threshold level of criticality.

8. The apparatus of claim 1 further comprising a threshold voltage generator configured to set one or more threshold voltages defining an undervoltage condition.

9. The apparatus of claim 1 wherein:
the first voltage monitor is arranged to determine an undervoltage condition in response to the supply voltage being less than a first threshold voltage, and
the second voltage monitor is arranged to determine an undervoltage condition in response to the supply voltage being less than a second threshold voltage different from the first voltage.

10. The apparatus of claim 9 wherein the control circuit is configured to disconnect the one or more predetermined loads within a response time of 100 μs from either of the first or second voltage monitors detecting an undervoltage condition.

11. The apparatus of claim 1 further comprising a storage circuit configured to record one or more instances of an undervoltage condition.

12. The apparatus of claim 11 wherein the storage circuit is a latch circuit.

13. A vehicle comprising:
a plurality of automotive system components defining a respective plurality of loads;
an electronic control unit for controlling the plurality of automotive system components;
a power supply for providing a supply voltage to the electronic control unit;
a load driver, controlled by the electronic control unit, for driving the plurality of loads; and
a control circuit configured to control the load driver to disconnect a predetermined set of loads of the plurality of loads from the supply voltage in response to receipt of at least one of a first undervoltage signal and a second undervoltage signal,
wherein a first voltage monitor is configured to monitor the supply voltage and, in response to an undervoltage condition being detected, output a first undervoltage signal to the control circuit,
wherein a second voltage monitor is configured to monitor the supply voltage and, in response to an undervoltage condition being detected, output a second undervoltage signal to the control circuit,
wherein the control circuit includes the first voltage monitor and the second voltage monitor, and
wherein the first voltage monitor and the second voltage monitor are connected to the supply voltage in parallel.

14. The vehicle of claim 13 wherein the electronic control unit is configured to control operation of the first and second voltage monitors.

15. The vehicle of claim 14, wherein the electronic control unit is configured to:
provide one or more first test signals to the first voltage monitor,
provide one or more second test signals to the second voltage monitor,
simulate one or more undervoltage conditions, and
compare operation of the control circuit with a predefined operation to verify disconnection of the predetermined set of loads in response to the simulated one or more undervoltage conditions.

* * * * *